US010862145B2

(12) United States Patent
Oh et al.

(10) Patent No.: US 10,862,145 B2
(45) Date of Patent: **\*Dec. 8, 2020**

(54) HUMIDIFYING DEVICE FOR FUEL CELL

(71) Applicants: HYUNDAI MOTOR COMPANY, Seoul (KR); KIA MOTORS CORPORATION, Seoul (KR)

(72) Inventors: Sae Han Oh, Suwon-Si (KR); Jeong Hee Park, Suwon-Si (KR); Kyoung Ku Ha, Anyang-Si (KR); Hyunyoo Kim, Seoul (KR); Chang Ha Lee, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 151 days.

This patent is subject to a terminal disclaimer.

(21) Appl. No.: 16/193,462

(22) Filed: Nov. 16, 2018

(65) Prior Publication Data

US 2019/0326618 A1  Oct. 24, 2019

(30) Foreign Application Priority Data

Apr. 18, 2018 (KR) ........................ 10-2018-0044820

(51) Int. Cl.
*H01M 8/04119* (2016.01)
*H01M 8/04828* (2016.01)

(52) U.S. Cl.
CPC ... *H01M 8/04149* (2013.01); *H01M 8/04141* (2013.01); *H01M 8/04835* (2013.01)

(58) Field of Classification Search
CPC ......... H01M 8/04149; H01M 8/04835; H01M 8/04141; H01M 8/04201; H01M 2250/20
See application file for complete search history.

(56) References Cited

U.S. PATENT DOCUMENTS

| 6,074,056 A * | 6/2000 | Kubo ..................... B41J 13/226 347/104 |
| 2001/0015500 A1* | 8/2001 | Shimanuki .......... B01F 3/04007 261/104 |
| 2010/0323259 A1* | 12/2010 | Sung ................. H01M 8/04228 429/429 |
| 2016/0036073 A1* | 2/2016 | Kim .................. H01M 8/04291 429/414 |
| 2019/0015787 A1* | 1/2019 | Oh .......................... H01M 8/04 |

FOREIGN PATENT DOCUMENTS

| JP | 2007-294359 A | 11/2007 |
| JP | 4603920 B2 | 12/2010 |
| KR | 10-2012-0096173 A | 8/2012 |
| KR | 10-2013-0029301 A | 3/2013 |
| KR | 10-1364354 B1 | 2/2014 |

\* cited by examiner

*Primary Examiner* — Muhammad S Siddiquee
(74) *Attorney, Agent, or Firm* — Morgan, Lewis & Bockius LLP

(57) ABSTRACT

A humidifying device, which exchanges moisture between air supplied from an air compressor and air exhausted from the fuel cell, for a fuel cell, includes: a housing main body; at least one humidifying membrane module disposed in the housing main body; and a valve assembly which is disposed in the housing main body and adjusts a supply amount of exhaust air flowed into the at least one humidifying membrane module based on a predetermined supply amount of supply air flowed into the at least one humidifying membrane module.

19 Claims, 13 Drawing Sheets

(b)

HUMIDIFYING DEVICE FOR FUEL CELL

CROSS-REFERENCE TO RELATED APPLICATION

This application claims priority to and the benefit of Korean Patent Application No. 10-2018-0044820 filed in the Korean Intellectual Property Office on Apr. 18, 2018, the entire contents of which are incorporated herein by reference.

TECHNICAL FIELD

The present disclosure relates to a fuel cell system of a vehicle, and more particularly, the present disclosure relates to a humidifying device for a fuel cell for humidifying air supplied to the fuel cell.

BACKGROUND

A fuel cell system is an electric generator that generates electrical energy through an electrochemical reaction of hydrogen and air by a fuel cell.

The fuel cell system has been used to drive electric power sources such as electric motors in vehicles, ships, trains, planes, etc.

The fuel cell system includes a stack of fuel cells consisting of air pole and fuel pole, an air supply system supplying air to the air pole of the fuel cells, a hydrogen supply system supplying hydrogen to the fuel pole of the fuel cells, and a water management system for operating temperature and cooling control.

Among these, the air supply system includes an air compressor for supplying the air sucking and compressing the outside air to the air pole of the fuel cells, and a humidifier for humidifying the air discharged from the air compressor to have an appropriate humidity and supplying the air to the air pole of the fuel cells.

The humidifier humidifies the air supplied from the air compressor using the moisture in the exhaust air discharged from the air pole of the fuel cell and supplies the humidified air to the air pole of the fuel cells.

On the other hand, when the fuel cell system as described above is employed in a fuel cell vehicle, the fuel cell system needs to control the humidifying amount of the humidifier supplied to the air pole of the fuel cells depending on the driving conditions of the vehicle.

In the conventional art, the humidifying amount of the humidifier is controlled, for example, by controlling the pressure of the supply air supplied to the humidifier and the air exhaust of the air pole through a valve.

However, in the conventional adjusting way of the humidifying amount, it is possible to increase the unnecessary space in the layout of the entire fuel cell system by separately installing the pressure control valve, and the like at the different air supply routes connected with the humidifier.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to provide a humidifying device for a fuel cell for maintaining a humidifying performance, minimizing an unnecessary space on the layout of the fuel cell system, and adjusting a humidifying amount depending on a driving condition of a vehicle with a simple configuration.

According to an exemplary embodiment of the present disclosure, a humidifying device, which exchanges moisture between air supplied from an air compressor and exhaust air exhausted from a fuel cell, for the fuel cell may include: a housing main body; at least one humidifying membrane module disposed in the housing main body; and a valve assembly which is disposed in the housing main body and adjusts a supply amount of exhaust air flowed into the at least one humidifying membrane module based on a predetermined supply amount of supply air flowed into the at least one humidifying membrane module.

The valve assembly may include a valve housing of a cylinder shape of having a valve passage; and a valve body of a cylinder shape having a connecting passage connected with the valve passage and being provided to be rotatable inside the valve body.

The valve assembly may increase or decrease the opening of the valve passage and the connecting passage through the rotation of the valve body and adjusts the supply amount of the exhaust air.

The valve passage may be closed by the rotation of the valve body to bypass the exhaust air to the outside of the housing main body.

According to another exemplary embodiment of the present disclosure, a humidifying device, which exchanges moisture between air supplied from an air compressor and air exhausted from a fuel cell, for the fuel cell may include: a housing main body including a first cap with a supply air inlet, a second cap with a humidifying air outlet and a mid-housing between the first and second caps; at least one humidifying membrane module disposed in the mid-housing, wherein the at least one humidifying membrane includes a case having a plurality windows spaced apart from each other in a longitudinal direction, a plurality of hollow fiber membranes for connecting the first and second caps inside the case; a valve body rotatable disposed inside the mid-housing and having a cylinder shape with a first end closed, wherein the valve body has a plurality of connecting passages corresponding to the plurality of windows; and a valve housing of a cylinder shape having a plurality of valve passages selectively connected with the plurality of connecting passages, wherein the valve housing includes an exhaust air inlet and an exhaust air outlet communicate with an interior of the valve body, and is coupled to an external circumference of the valve body in a axial direction, and is fixed at the mid-housing.

The humidifying membrane module may be fixed at both sides of the mid-housing through a potting layer.

A valve actuator for rotating the valve body may be provided at an inner side surface of the second cap; and one side of the valve body may be connected with the valve actuator and the other side thereof may be formed of a closed cylinder shape inside the mid-housing.

At least one shell out hole connected with the inside of the mid-housing may be formed in the exhaust air outlet.

The humidifying membrane module may form a shell side as an exhaust air flow passage around the hollow fiber membranes in the case of a cylinder shape.

The humidifying membrane module may be composed of a plurality of humidifying membrane modules to be radially arranged around the valve housing.

The humidifying membrane module may be sliding-coupled to an inner side surface of the mid-housing through at least one protrusion formed at an external circumference of the case in a longitudinal direction.

The valve body may be provided to be rotatable at a predetermined rotation angle range by the valve actuator and include a slot formed to be always connected with the exhaust air inlet and exhaust air outlet in the rotation angle range.

The valve housing may be fixed at the mid-housing through the exhaust air inlet and exhaust air outlet.

The exhaust air inlet may be located at the second cap to be fixed at the mid-housing; and the exhaust air outlet may be located at the first cap to be fixed at the mid-housing.

The connecting passage may be formed of a hole shape and formed as a plurality of rows at predetermined intervals along a longitudinal direction of the valve body; and the valve passage may be formed of a hole shape corresponding to the connecting passage and formed as a plurality of rows at predetermined intervals along a longitudinal direction of the valve housing.

The connecting passage and valve passage may be formed in a shape of hole whose size gradually decreases from the exhaust air inlet to the exhaust air outlet.

The connecting passage and valve passage may be formed only in a predetermined section of the valve body and valve housing at the side of the exhaust air inlet.

The connecting passage and valve passage may be asymmetrically formed in a predetermined section of the valve body and valve housing at the sides of the exhaust air inlet and exhaust air outlet.

The connecting passage may be a single hole shape and formed as a plurality of rows along a longitudinal direction of the valve body; and the valve passage may be a single hole shape corresponding to the connecting passage and formed as a plurality of rows along a longitudinal direction of the valve housing.

The plurality of hollow fiber membranes may be packaged in a bundle shape by a mesh net and inserted into the case.

In accordance with a humidifying device for a fuel cell according to exemplary embodiments of the present disclosure, the humidifying amount of air supplied to the fuel cell stack can be adjusted by controlling the supply amount of the exhaust air to the humidifying membrane module depending on the driving conditions of a vehicle through the valve assembly integrally coupled to with the humidifying device.

In addition, the valve assembly is integrated into the humidifying device, thereby minimizing the unnecessary space on the layout of the fuel cell system while maintaining the humidifying performance, which makes the entire layout of the fuel cell system compact.

In addition, the effects obtainable or predicted by exemplary embodiments of the present disclosure are to be disclosed directly or implicitly in a detailed description of the present disclosure.

That is, various effects predicted according to an exemplary embodiment of the present disclosure will be disclosed in a detailed description to be described later.

BRIEF DESCRIPTION OF THE DRAWINGS

The drawings are used for reference in describing exemplary embodiments of the present disclosure, and thus, the technical spirit of the present disclosure should not be analyzed to be limited to the accompanying drawings.

DETAILED DESCRIPTION OF THE EMBODIMENTS

Figure 1:
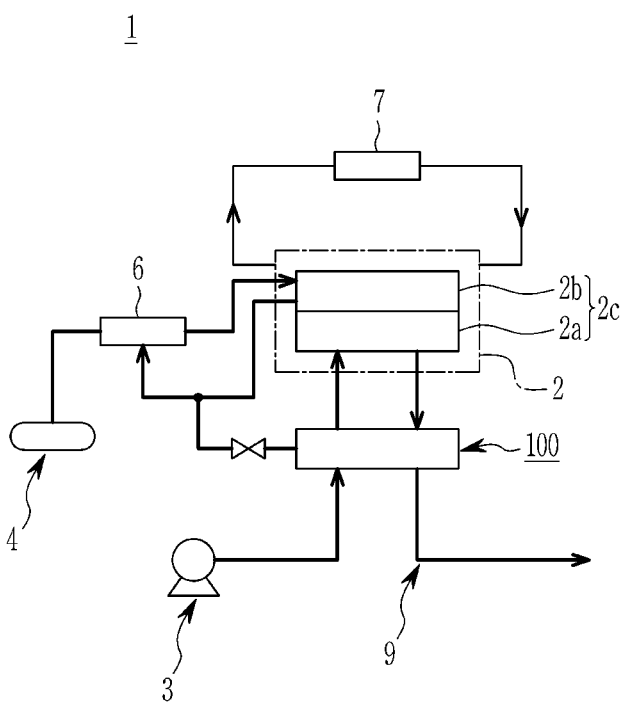
FIG. 1 is a block diagram schematically illustrating an example of a fuel cell system to which an exemplary embodiment of the present disclosure is applied.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure.

The drawings and description are to be regarded as illustrative in nature and not restrictive and like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

FIG. 1 is a block diagram schematically illustrating an example of a fuel cell system to which an exemplary embodiment of the present disclosure is applied.

Referring to FIG. 1, a fuel cell system 1 according to an exemplary embodiment of the present disclosure may be an electric generator that produces electrical energy by electrochemical reaction of fuel and oxidizer, and, for example, applied to in a fuel cell vehicle that drives electric motor as electrical energy.

In an exemplary embodiment of the present disclosure, the fuel used in the fuel cell system 1 can be defined as hydrogen gas (hereinafter, referred to as "hydrogen" for convenience), and the oxidizer used in the fuel cell system 1 can be defined as air.

The fuel cell system 1 may fundamentally include a fuel cell stack 2, an air supply system 3, a hydrogen supply system 4, a humidifying device 100, a hydrogen recirculation system 6 and heat and water management system 7.

The fuel cell stack 2 may be an electricity generating collectivity of fuel cells 2c including a membrane (not shown in the drawing), an air pole 2a and a fuel pole 2b.

The fuel cells 2c may receive hydrogen through the fuel pole 2b and receive air through the air pole 2a to generate electrical energy by the reaction of hydrogen and oxygen electrochemical.

The air supply system 3 may be operated by the power supply and supplies air in the air to the air pole 2a of the fuel cells 2c. The air supply system 3 may include, for example, an air compressor. The hydrogen supply system 4 may include a hydrogen tank that compresses and stores hydrogen and supplies hydrogen to the fuel pole 2b of the fuel cells 2c.

The humidifying device 100 to which an exemplary embodiment of the present disclosure is applied may include a membrane-humidifying which humidifies air supplied from the air supply system 3 using the moisture-containing air discharged from the air pole 2a of the fuel cells 2c and supplies the humidified air to the air pole 2a.

The hydrogen recirculation system 6 can recirculate the hydrogen exhausted from the fuel pole 2b of the fuel cell 2c to the fuel pole 2b. The hydrogen recirculation system 6 may mix the exhaust hydrogen exhausted from the fuel pole 2b and the supply hydrogen supplied from the hydrogen supply system 4 through an ejector, and the like, and then, supply to the fuel pole 2b.

The heat and water management system 7 controls the operating temperature of the fuel cell stack 2 by removing heat and water, which are by-products of the electrochemical reaction of fuel cells 2c.

Since various constituent elements of fuel cell system 1 are well known in the art, a detailed description of the constituent elements in this specification will be omitted.

On the other hand, when the fuel cell system 1 as described above is employed in a fuel cell vehicle, since the flow rate of the air supplied to the fuel cell stack 2 decreases when the vehicle is started, stopped or idled, it is a condition does not require humidification of the air. Such a condition is hereinafter referred to as a first condition (commonly referred to in the art as "low flow rate condition").

When the vehicle travels, the flow rate of the air supplied to the fuel cell stack 2 increases depending on the running state, etc., and it is a condition that requires the humidifying of the air. Such a condition is hereinafter referred to as a second condition (commonly referred to in the art as "high temperature condition").

In the first condition, the exhaust air from the fuel cell stack 2 is exhausted to the exhaust system 9, not used to humidify the supply air.

In the second condition, the exhaust air from the fuel cell stack 2 is used to humidify the supply air.

The first and second conditions as described above can be determined by the power consumed in the air compressor of the air supply system 3.

Furthermore, the first and second conditions can be determined by the measure results of the flow rate and pressure of the fuel cell system 1.

That is, the first and second conditions can be determined by predetermined control logic of a controller depending on the detection signals of various sensors that detect the starting, stopping, idle, and running states of the fuel cell vehicle.

In the exemplary embodiment of the present disclosure, the first and second conditions of the fuel cell system 1 are clearly distinguished depending on the state of the vehicle (start, run, stop, idle state, etc.) so that the first and second conditions are not limited to any particular range of values.

On the other hand, in the humidifying device 100 according to the exemplary embodiment of the present disclosure, since membrane humidification is performed by moisture exchange between the exhaust air (including moisture) exhausted from the air pole 2a of the fuel cell 2c and the supply air supplied from the air compressor of the air supply system 3, the humidifying device 100 may be configured by a membrane humidifying device that can supply the humidified air to the air pole 2a of the fuel cell 2c.

In the humidifying device 100, exhaust air, which is not involved or participates in humidifying, is externally exhausted and is controlled by a pressure control valve to be exhausted to the outside.

The humidifying device for a fuel cell 100 may maintain humidifying performance, minimize unnecessary space on the layout of the fuel cell system 1, and adjust the humidifying amount depending on driving condition of the vehicle with its simple configuration.

Figure 2:
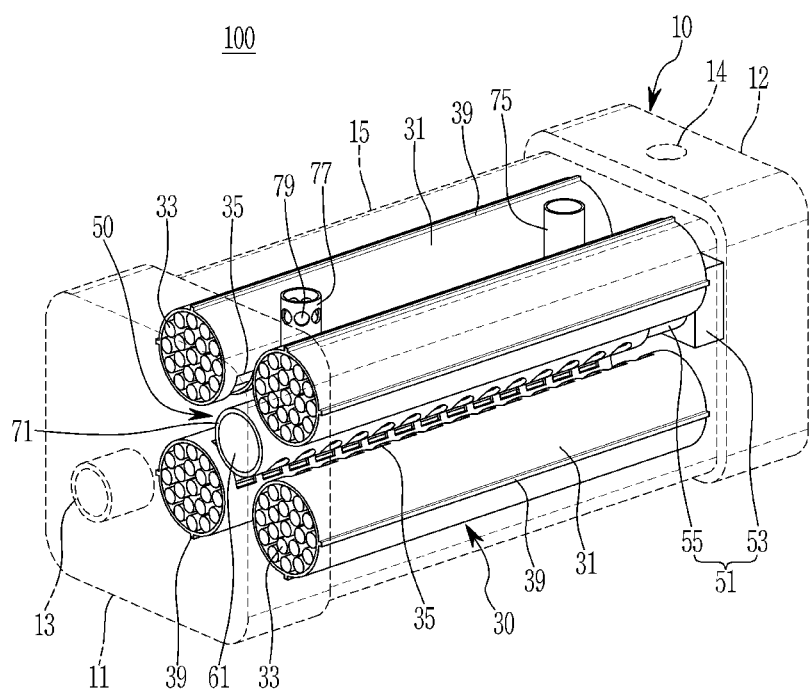
FIG. 2 is a combined perspective view showing a humidifying device for a fuel cell according to an exemplary embodiment of the present disclosure.
Figure 3:
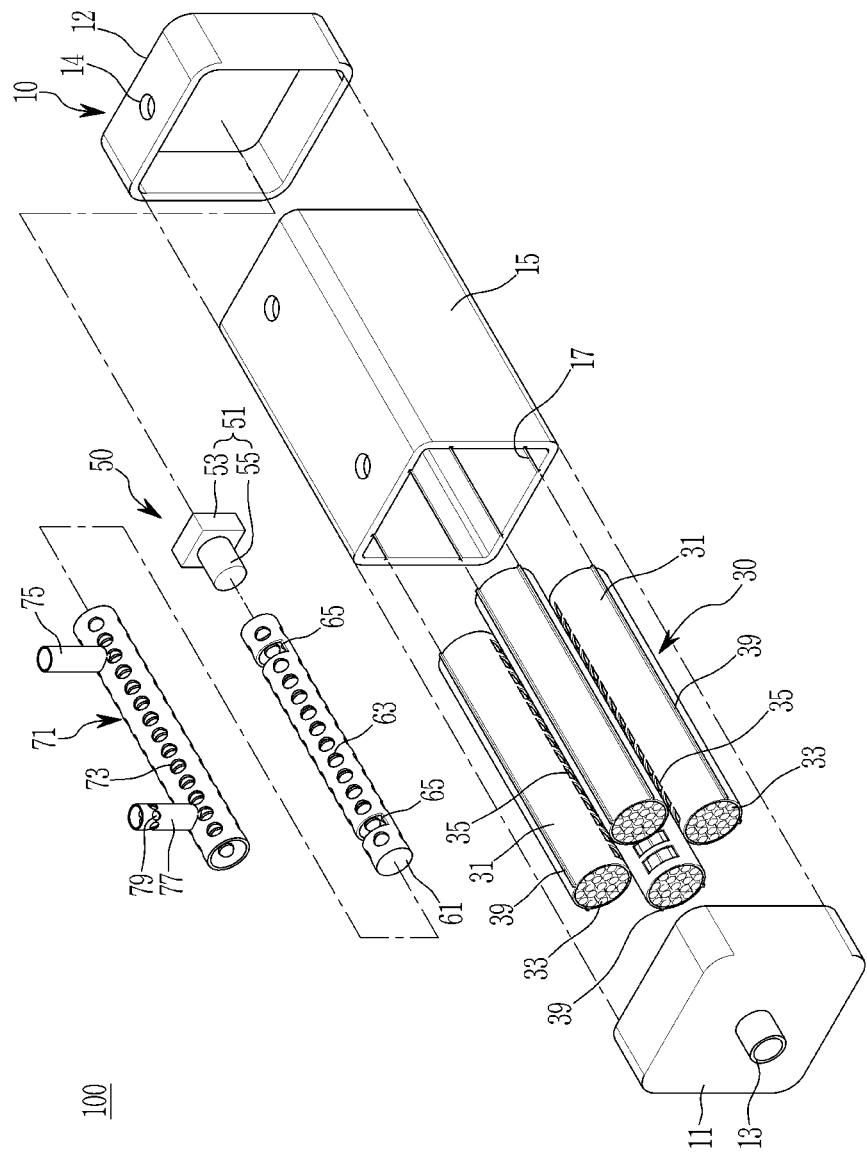
FIG. 3 is an exploded perspective view illustrating the humidifying device for the fuel cell according to an exemplary embodiment of the present disclosure.
Figure 4A:
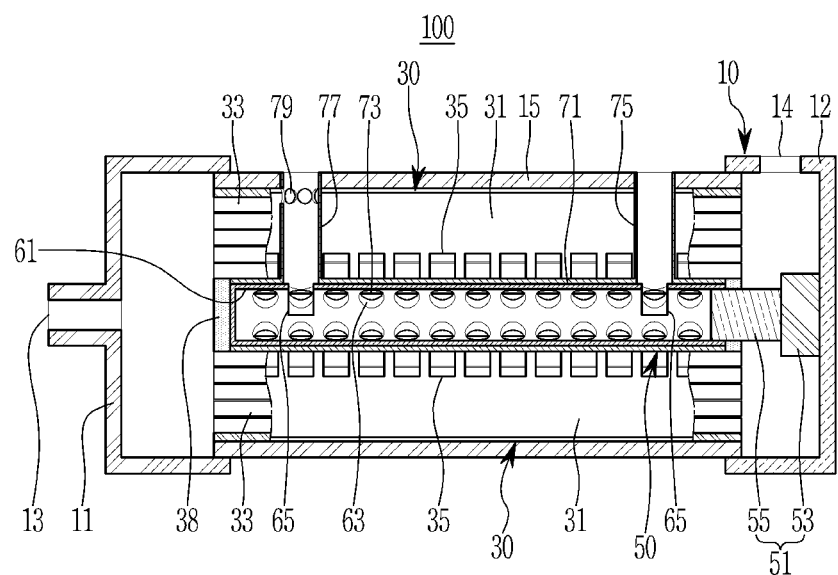
FIGS. 4A and 4B are cross-sectional views of the humidifying device for the fuel cell of an exemplary embodiment of the present disclosure.
Figure 4B:
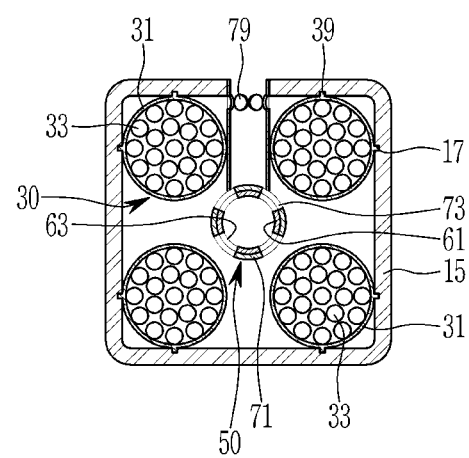

FIG. 2 is a combined perspective view showing a humidifying device for a fuel cell according to an exemplary embodiment of the present disclosure. FIG. 3 is an exploded perspective view illustrating the humidifying device for the fuel cell according to an exemplary embodiment of the present disclosure. FIGS. 4A and 4B are cross-sectional views of the humidifying device for the fuel cell of an exemplary embodiment of the present disclosure.

Referring to FIG. 2 to FIGS. 4A and 4B, the humidifying device for the fuel cell 100 according to an exemplary embodiment of the present disclosure may include a housing main body 10, a humidifying membrane module 30, and a valve assembly 50, which will be described in detail.

In the exemplary embodiment of the present disclosure, the housing main body 10 may include a first cap 11, a second cap 12, and a mid-housing 15.

The first cap 11 is also referred to in the art as a "cap-in" or "tube-in" in the mid-housing 15 and is also referred to as an air supply system (see "3" FIG. 1) to inject air supplied through an air compressor into the humidifying membrane module 30, which will be described later.

The first cap 11 may be coupled to one end portion of the mid-housing 15 to be described later, and may have a supply air inlet 13 for flowing in the supply air to the humidifying membrane module 30. In addition, the first cap 11 may be provided with an air cooler (not shown in drawings) for cooling the supply air.

The second cap 12 is also referred to in the art as a "cap-out" or "tube-out" and can exhaust the humidifying air flowed into from the humidifying membrane module 30 to the fuel cell stack 2.

The second cap 12 may be coupled to the other end portion of the mid-housing 15, and may have a humidifying air outlet 14 for exhausting the humidifying air to the fuel cell stack 2.

The mid-housing 15 is referred to in the art as a "shell" and provided between the first and second caps 11 and 12 with both sides thereof opened.

For example, the mid-housing 15 may be provided in the form of a quadrangle as in the drawing, or may be provided in a circular sectional shape not shown in the drawing.

In an exemplary embodiment of the present disclosure, the humidifying membrane module 30 may generate a supply air supplied from the air compressor of the air supply system 3 to the supply air inlet 13 of the first cap 11 and a humidifying air through moisture exchange with the exhaust air, which contains moisture and is exhausted from the fuel cell stack 2.

The humidifying membrane module 30 may be membrane-humidified by the supply air and the exhaust air and supply the humidified air to the fuel cell stack 2 through the humidifying air outlet 14 of the second cap 12.

The humidifying membrane module 30 may be installed inside the housing main body 10 and installed inside the mid-housing 15 in plural.

Figure 5A:
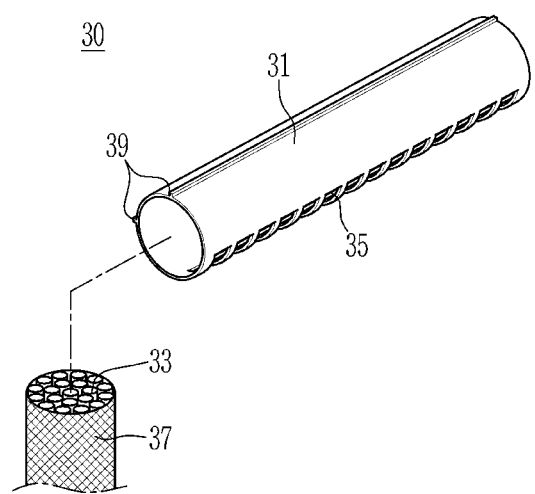
FIGS. 5A and 5B are drawings illustrating a humidifying membrane module applied to humidifying device of the fuel cell according to an exemplary embodiment of the present disclosure.
Figure 5B:
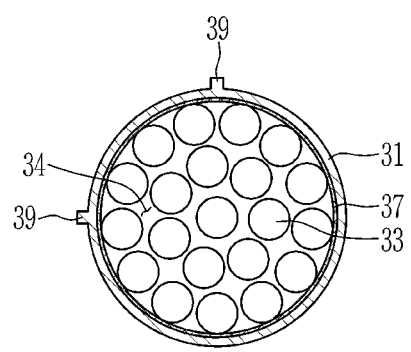
Figure 6A:
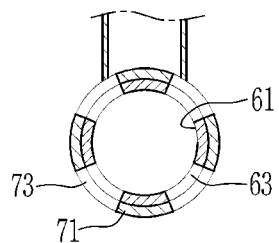
FIGS. 6A, 6B, and 6C are cross-sectional views showing a valve body and valve housing of a valve assembly applied to the humidifying device for the fuel cell according to an exemplary embodiment of the present disclosure.
Figure 6B:
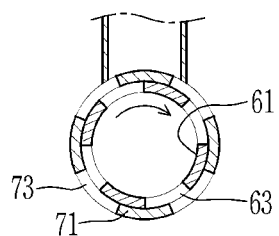
Figure 6C:
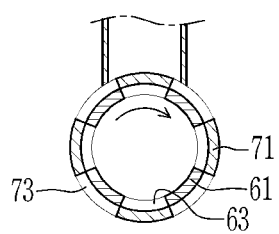

This humidifying membrane module 30 may include, as shown in FIGS. 5A and 5B, a case 31 and a plurality of hollow fiber membranes 33.

The case 31 may be formed of a cylinder shape with both ends thereof open and disposed inside of the mid-housing 15. The case 31 may have a plurality of windows 35 spaced apart along the longitudinal direction at regular interval in the case 31.

However, it should not be construed that the windows 35 are formed to be spaced apart at regular interval, and may be formed as a single hole along the longitudinal direction of the case 31.

The hollow fiber membranes 33 may be formed of a bundle shape and are embedded in case 31, which makes a membrane humidifying of supply air and exhaust air substantially. The hollow fiber membranes 33 may be packaged in a bundle by a mesh net 37 and inserted inside the case 31.

The mesh net 37 serves to uniformly distribute the exhaust air through the windows 35 of the case 31 and prevent damage to the hollow fiber membranes 33 when the case 31 of the hollow fiber membranes 33 is inserted.

Furthermore, the case 31 may be slidingly coupled to the inner surface of the mid-housing 15 with the hollow fiber membranes 33 embedded therein. Here, the case 31 may have a plurality of guide protrusions 39 formed along the longitudinal direction on the external circumference side of the case 31. The guide protrusion 39 may be slidingly coupled along a longitudinal direction to a guide groove 17 formed on the inner surface of the mid-housing 15.

The humidifying membrane module 30 as described above may be fixed to both sides of the mid-housing 15 through a potting layer 38.

The potting layer 38 may be made of a polymeric material to close the open ends on both sides of the mid-housing 15. The potting layer 38 can fix both ends of the case 31 located inside the mid-housing 15 and supports the hollow fiber membranes 33 inside the case 31. Herein, the hollow fiber membranes 33 may connect the interior of the first and second caps 11 and 12 while supported in the potting layer 38.

Inside the case 31 of the cylinder shape, a shell side 34 may be formed as an exhaust air flow path around the hollow fiber membranes 33.

The shell side 34 may be connected with the interior of the mid-housing 15 through the windows 35 of case 31.

In an exemplary embodiment of the present disclosure, the valve assembly 50 may adjust the amount of exhaust air flowed into the shell side 34 inside the case 31 through the windows 56 in the mid-housing 15 based on a predetermined supply amount of supply air being flowed into the hollow fiber membranes 33 of the humidifying membrane module 30.

That is, the valve assembly 50 can increase or decrease the valve opening and adjust the supply amount of exhaust air being flowed into the shell side 34 inside the case 31 in the mid-housing 15. In addition, the valve assembly 50 bypasses the exhaust air from the interior of the mid-housing 15 to the exterior by closing.

The valve assembly 50 may be installed substantially inside the housing main body 10. The valve assembly 50 may include a valve actuator 51, a valve body 61, and a valve housing 71.

The valve actuator 51 may be connected to the valve body 61 to be described later and provided on the inner surface of the second cap 12 for rotating the valve body 61 at a predetermined rotation angle range.

The valve actuator 51 may include a motor 53 operated by receiving power and a reduction gear (not shown in the drawing) that reduces the rotation speed of the motor 53. The valve actuator 51 may further include a driving shaft 55 connected with the reduction gear.

Hereinafter, the valve body 61 and the valve housing 71, which are applied to the valve assembly 50 according to an exemplary embodiment of the present disclosure and the coupling structure of the valve body 61 and the valve housing 71 will be described referring to FIG. 2 to FIGS. 4A and 4B.

In the exemplary embodiment of the present disclosure, the valve body 61 may be supported to be rotatable inside the second cap 12 through the valve actuator 51.

The valve body 61 may be provided in a cylinder shape with both ends closed and disposed inside the mid-housing 15 through the potting layer 38 corresponding to the second cap 12.

Herein, one side of the valve body 61 may be connected to the driving shaft 55 of the valve actuator 51, and the other side of the valve body 61 is closed inside the mid-housing 15.

Since one side of the valve body 61 is connected to the drive shaft 55 of the valve actuator 51 and the other side is closed, both ends of the valve body 61 can be regarded as closed.

The valve body 61 may be connected to the driving side 55 of the valve actuator 51 so that the valve body 61 can be rotated in the forward and reverse directions at a predetermined rotation angle range (for example, 0-90 degrees) by driving the valve actuator 51.

Furthermore, the valve body 61 may form connecting passages 63 corresponding to the windows 35 of the case 31 of the humidifying membrane module 30.

The connecting passages 63 may be disposed close to windows 35 of the case 31 and connected with the inside of the valve body 61.

The connecting passages 63 may be composed of a plurality of holes in an exemplary embodiment of the present disclosure and formed as a plurality of rows at predetermined intervals along the longitudinal direction of the valve body 61, for example, rows at intervals of 90 degrees with respect to a circular cross section of the valve body 61.

The connecting passages 63 may be formed as circular holes, as shown in the drawing. However, it is not necessarily limited to this and may be formed in various shapes such as triangle and quadrangle.

In the exemplary embodiment of the present disclosure, the valve housing 71 may surround the external circumference of the valve body 61 inside the mid-housing 15 and may be fixed to the mid-housing 15.

The valve housing 71 may be provided with a cylinder shape which is coupled in the axial direction to the external circumference side of the valve body 61.

The valve housing 71 may include an inner circumferential surface coupled to the outer circumferential surface of the valve body 61 in a surface contact manner.

That is, the valve body 61 may be rotated by the valve actuator 51 while the valve housing 71 is fixed to the mid-housing 15 and the external circumferential surface of the valve body 61 is slidably in contact with the inner circumference surface of the valve housing 71.

The valve housing 71 may form an exhaust air inlet 75 and an exhaust air outlet 77 connected to the inside of the valve body 61.

The exhaust air inflow 75 and the exhaust air outlet 77 may be provided in the form of a pipe which is integrally connected with the valve housing 71.

Herein, the exhaust air inlet 75 and the exhaust air outlet 77 may be fixed to the mid-housing 15 inside the mid-housing 15.

In this case, the inlet end of the exhaust air inlet 75 and the outlet end of the exhaust air outlet 77 may be connected with the outside of the mid-housing 15.

Therefore, the valve housing 71 may be secured to the mid-housing 15 through an exhaust air inlet 75 and an exhaust air outlet 77.

Furthermore, the exhaust air inlet 75 may be located at the second cap 12 to be fixed to the mid-housing 15, and the exhaust air outlet 77 may be located at the first cap 11 to be fixed to the mid-housing 15.

The exhaust air inlet 75 allows the exhaust air exhausted from the fuel cell stack 2 to flow into inside of the valve body 61 and is also referred to "shell-in".

Further, the exhaust air outlet 77 serves to exhaust the exhaust air, which does not participate in humidifying or participate in humidifying through the humidifying membrane module 30, to exhaust system 9 (refers to FIG. 1 below) and is also referred to as "shell-out" in the art.

The exhaust air inlet 75 and exhaust air outlet 77 as described above are always connected with the inside of the valve body 61 at a predetermined rotation angle range of the valve body 61.

Here, the valve body 61 may include a slot 65 formed to be connected with an exhaust air inlet 75 and an exhaust air outlet 77, respectively.

The slot 65 may be connected to passages of the exhaust air inlet 75 and the exhaust air outlet 77, respectively.

For example, the slot 65 may be formed as a slot hole of 180 degrees along the external circumference direction of the valve body 61 corresponding to the exhaust air inlet 75 and the exhaust air outlet 77.

Accordingly, the exhaust air inlet 75 and the exhaust air outlet 77 can always be connected to the inside of the valve body 61 through the slot 65 at a rotation angle range of the valve body 61.

However, as an exemplary variation, the exhaust air inlet 75 is constantly connected with the interior of the valve body 61, and the exhaust air outlet 77 may be selectively connected to the interior of the valve body 61.

Furthermore, the exhaust air outlet 77 may form a plurality of shell out holes 79 connected to the interior space of the mid-housing 15 inside the mid-housing 15.

The shell out holes 79 function inside the mid-housing 15 to exhaust the exhaust air, which does not participate in humidifying or participate in humidifying through the humidifying membrane module 30, outside the mid-housing 15 through the exhaust air outlet 77.

The valve housing 71 may form valve passages 73 selectively connected to the connecting passages 63 of the valve body 61 by the rotation of the valve body 61.

The valve passages 73 may be formed of a plurality of holes corresponding to the connecting passages 63 and may be formed of a plurality rows at predetermined intervals along the longitudinal direction of the valve housing 71, that is, as rows corresponding to connection passage 63.

The valve passages 73 may be formed of circular holes as shown in drawings. However, the present disclosure is not limited thereto, and may be formed in various shapes such as triangle and quadrangle.

The valve passage 73 can be connected to the connecting passage 63 by the rotation of the valve body 61 in a full open type, and can be connected to the connecting passage 63 in a partial open type and can be closed in a full close type by the external circumference region of the valve body 61.

On the other hand, the coupling structure of the valve body 61 and the valve housing 71 as described above may be disposed close to the above-mentioned plurality of humidifying membrane modules 30 and the windows 35 of the case 31 of the humidifying membrane modules 30.

For example, the plurality of humidifying membrane modules 30 may be disposed radially close to each other around the coupling structure of the valve body 61 and the valve housing 71. Herein, the valve passages 73 of the valve housing 71 may be disposed close to the windows 35 of the case 31 and interconnected with the windows 35.

Hereinafter, an operation of the humidifying device for the fuel cell 100 according to an exemplary embodiment of the present disclosure will be described in detail with reference to accompanying drawings.

FIGS. 7A, 7B, 8A, 8B, 9A, and 9B are drawings illustrating the operation of the humidifying device for the fuel cell according to an exemplary embodiment of the present disclosure.

Figure 7A:
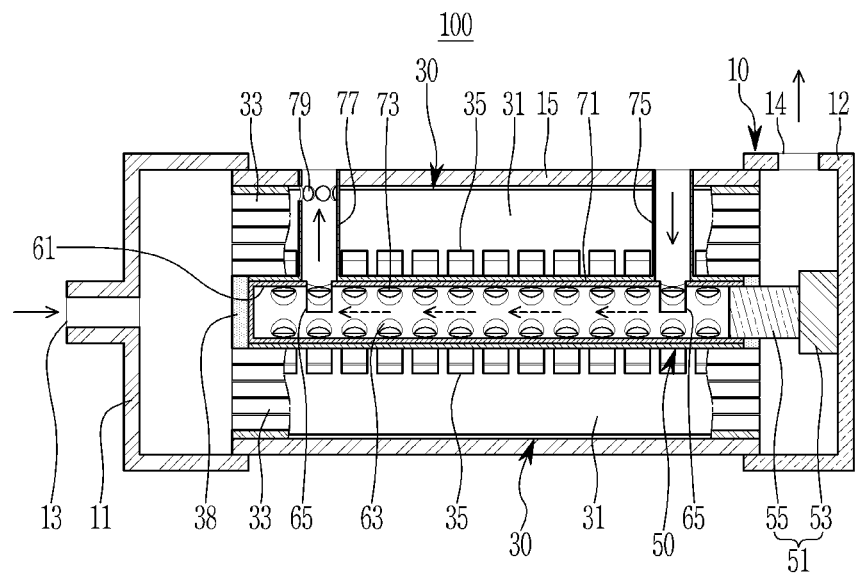
FIGS. 7A, 7B, 8A, 8B, 9A, and 9B are drawings illustrating the operation of the humidifying device for the fuel cell according to an exemplary embodiment of the present disclosure.
Figure 7B:
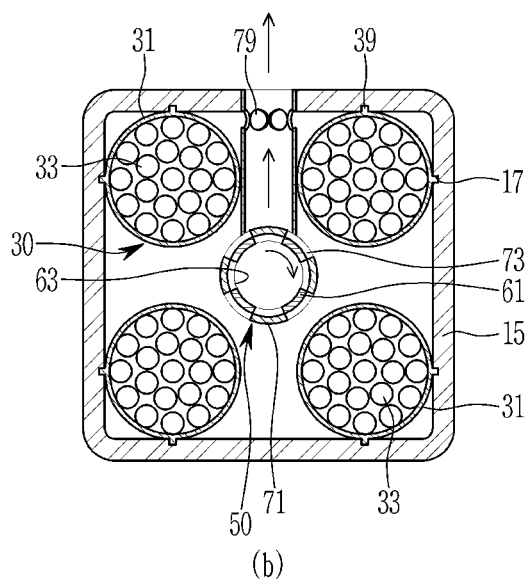

First, referring to FIGS. 7A and 7B, the first condition when starting, idling or stopping the fuel cell vehicle starting is a condition that the air supply to the fuel cell stack 2 decreases and the air does not need humidifying.

In the first condition, the valve body 61 is rotated through the valve actuator 51 to a first angle range within a predetermined rotation angle range, and the valve passages 73 of the valve housing 71 are completely closed by the external circumference area of the valve body 61.

The connecting passages 63 of the valve body 61 are not connected to the valve passages 73 of the valve housing 71 but are completely closed by the inner peripheral region of the valve housing 71.

During this process, the supply air supplied from the air compressor of the air supply system 3 is flowed through the supply air inlet 13 into the first cap 11, and then, flows from the first cap 11 through the hollow membranes 33 of the humidifying membrane module 30 to the second cap 12.

Simultaneously, the exhaust air of the relatively low temperature and low pressure discharged from the fuel cell stack 2 is flowed into the valve body 61 through the exhaust air inlet 75 of the valve housing 71.

Then, the valve passages 73 of the valve housing 71 are completely closed, and the exhaust air flowed into the valve body 61 is bypassed to the exhaust system 9 through the exhaust air outlet 77.

In this case, the supply air flowed into the second cap 12 is exhausted through the humidifying air outlet 14 without being humidified to be supplied to the fuel cell stack 2.

On the other hand, the second condition during the fuel cell vehicle is running is a condition that the air rate supplied to the fuel cell stack 2 increases and the humidifying of the air is required.

Figure 8A:
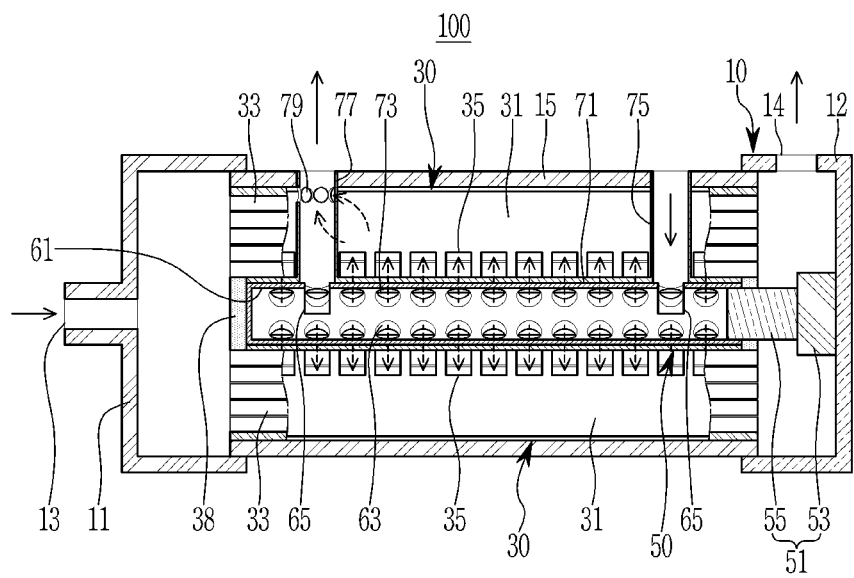
Figure 8B:
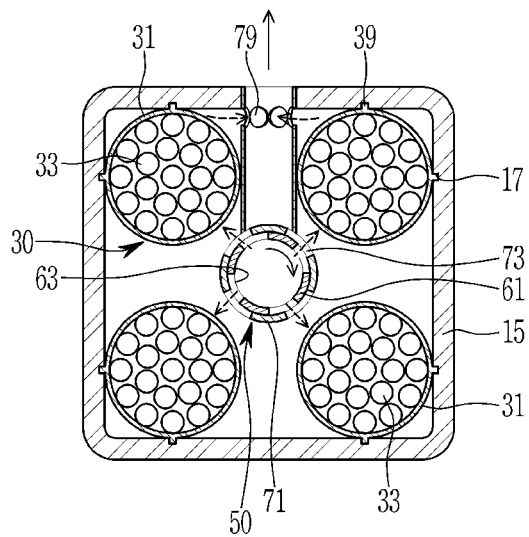

In the second condition, as shown in FIGS. 8A and 8B, the valve body 61 is rotated by the valve actuator 51 to a second angle range within a predetermined rotation angle range, and the valve passages 73 of the valve housing 71 are partially opened.

The connecting passages 63 of the valve body 61 are partially connected to the valve passages 73 of the valve housing 71, and are partially opened through the valve passages 73.

Figures 9A, 9B:
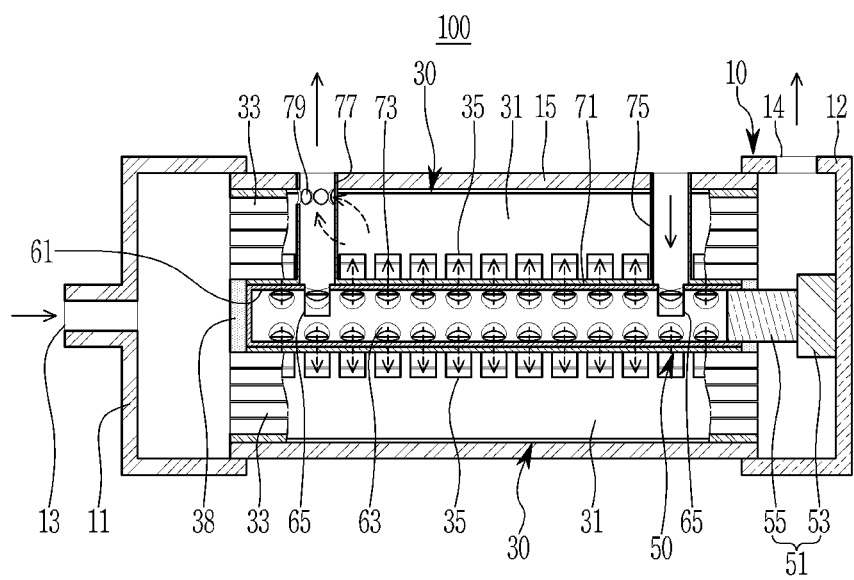

In the second condition, as shown in FIGS. 9A and 9B, the valve body 61 is rotated by the valve actuator 51 to a third angle range within a predetermined rotation angle range, and the valve passages 73 of the valve housing 71 are fully opened.

Herein, the connecting passages 63 of the valve body 61 are completely connected to the valve passages 73 of the valve housing 71, and are completely opened through the valve passage 73.

During this process, the supply air supplied from the air compressor of the air supply system 3 is flowed through the supply air inlet 3 into the first cap 11, and then, flows through the hollow membranes 33 of the humidifying membrane module 30 from the first cap 11 to the second cap 12.

Simultaneously, the humid exhaust air of the relatively high temperature and high pressure exhausted from the fuel cell stack 2 is flowed into the valve body 61 through the exhaust air inlet 75 of the valve housing 71.

Then, the valve passages 73 of the valve housing 71 are partly or completely opened, and the exhaust air flowed into the valve body 61 is discharged through the valve passages 73 in the interior of the mid-housing 15.

Thus, the exhaust air discharged through the valve passages 73 can flow into the case 31 through the windows 35 of the case 31 of the humidifying membrane module 30, and then, flow to the shell side 34 around the hollow fiber membranes 33 in the case 31.

Therefore, in the exemplary embodiment of the present disclosure, the humidifying of the supply air can be achieved by moisture exchange between the supply air flowing to the second cap 12 through the hollow fiber membranes 33 in the first cap 11 and the exhaust air flowing in the sell side 34.

This humidified air as like this is then flowed into the second cap 12, exhausted through the humidifying air outlet 14 of the second cap 12, and supplied to the fuel cell stack 2.

In the process described above, the exhaust air as the exhaust air which has participated in the humidifying of the supply air and the exhaust air which does not participated in the humidifying of the supply air, is discharged inside the mid-housing 15 through the shell out holes 79 to the exhaust air outlet 77, and then, discharged to the exhaust system 9.

In accordance with the humidifying device for a fuel cell 100 according to an exemplary embodiment of the present disclosure as described above, the valve assembly 50 is integrally formed inside the housing main body 10, and the openings of the connecting passages 63 of the valve body 61 and the valve passages 73 of the valve housing 71 are increased or decreased by the rotation of the valve body 71 depending on the driving conditions of the vehicle, so that it is possible to adjust the supply amount of the exhaust air to the humidifying membrane module 30.

Further, in the exemplary embodiment of the present disclosure, the valve passages 73 of the valve housing 71 are closed through the rotation of the valve body 61, and the exhaust air can be bypassed to the exhaust system 9.

Thus, the humidifying amount of air supplied to the fuel cell stack 2 can be controlled by controlling the supply amount of exhaust air to the humidifying membrane module 30 through the valve assembly 50 depending on the driving conditions of the vehicle.

Therefore, according to the exemplary embodiment of the present disclosure, by integrating the valve assembly 50 into the humidifying device 100, unnecessary space on the layout of the fuel cell system 1 can be minimized while keeping the humidifying performance intact and thus the layout of the entire fuel cell system 1 can be compactly implemented.

Further, in the exemplary embodiment of the present disclosure, since the exhaust air of the fuel cell stack 2 can be bypassed to the exhaust system 9 at starting, stopping, or idle condition of the fuel cell vehicle, it is possible to minimize the condensed water flowing into humidifying membrane module 30. Thus, it is further possible to prevent cell dropout of the fuel cell stack 2 due to the condensed water which is accumulated in the humidifying membrane module 30.

Hereinafter, exemplary variations of the valve body and valve housing applied to the humidifying device for the fuel cell according to the exemplary embodiment of the present disclosure will be described with reference to the accompanying drawings.

FIG. 10 to FIG. 13 are drawings illustrating exemplary variations of the valve body and valve housing applied to the humidifying device for the fuel cell according to the exemplary embodiment of the present disclosure.

Figure 10:
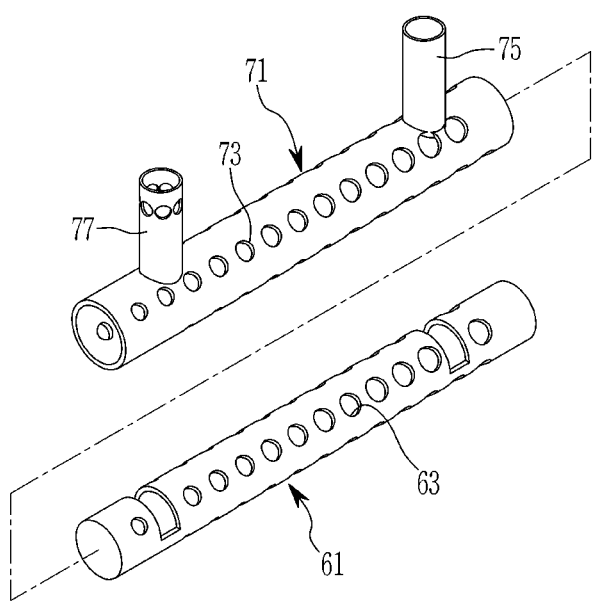
FIG. 10 to FIG. 13 are drawings illustrating variation examples of the valve body and valve housing applied to the humidifying device for the fuel cell according to an exemplary embodiment of the present disclosure.

First, referring to FIG. 10, as the first exemplary variation, the connecting passages 73 of the valve body 61 and the valve passages 73 of the valve housing 71 may be formed of holes of different sizes along the longitudinal directions of the valve body 61 and the valve housing 71.

For example, the connecting passages 63 and the valve passages 73 are formed of holes whose sizes gradually decrease from the exhaust air inlet 75 of the valve housing 71 to the exhaust air outlet 77.

That is, the connecting passages 63 and the valve passages 73 close to the exhaust air inlet 75 of the valve housing 71 are formed with holes of a size larger than the connecting passages 63 and the valve passages 73 close to the exhaust air outlet 77.

Accordingly, in the first exemplary variation, a relatively large amount of exhaust air is discharged from the exhaust air inlet 75 of the valve housing 71 through the connecting passages 63 and the valve passages 73, so that it is possible to cross-flow the supply air flowing through the hollow fiber membranes 33 and the exhaust air flowing through the shell side 34 in the humidifying membrane module 30.

In other words, in the first exemplary variation, the supply air flows from the first cap 11 to the second cap 12 through the hollow fiber membranes 33, and the exhaust air can be cross-flowed from the second cap 12 to the first cap 11 through the shell side 34.

Thus, in the first exemplary variation, the cross-flow of supply air and exhaust air in the humidifying membrane module 30 allows equal distribution of the exhaust air, maximizes the moisture exchange performance of the supply air and the exhaust air, and further improves the humidifying performance the humidifying device 100.

Figure 11:
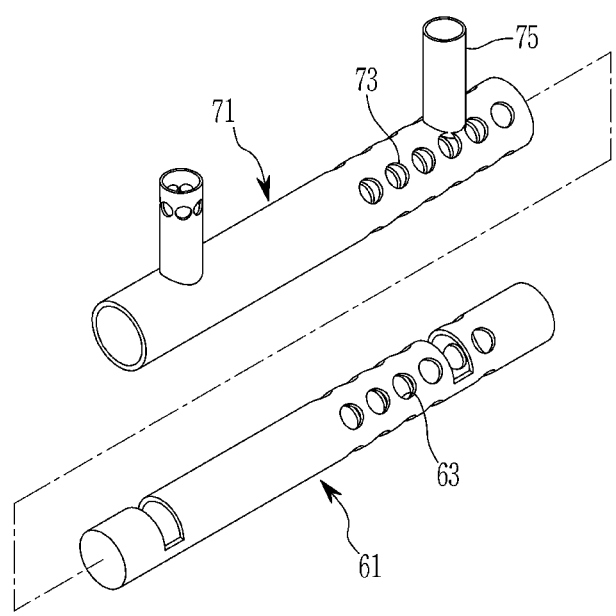

Referring to FIG. 11, as a second exemplary variation, the connecting passages 63 of the valve body 61 and the valve passages 73 of the valve housing 71 may be formed with holes of the same size only in a certain section of the valve body 61 and the valve housing 71 on the side of the exhaust air inlet 75 of the valve housing 71.

In the second exemplary variation, the exhaust air is discharged from the exhaust air inlet 75 of the valve housing 71 through the connecting passages 63 and the valve passages 73, so that the supply air flowing through the hollow fiber membranes 33 of the humidifying membrane module 30 and the exhaust air flowing through the shell side 34 can be cross-flowed.

Since the action and effect in the second exemplary variation as described above is the same as in the first exemplary variation, the detailed description will be omitted.

Figure 12:
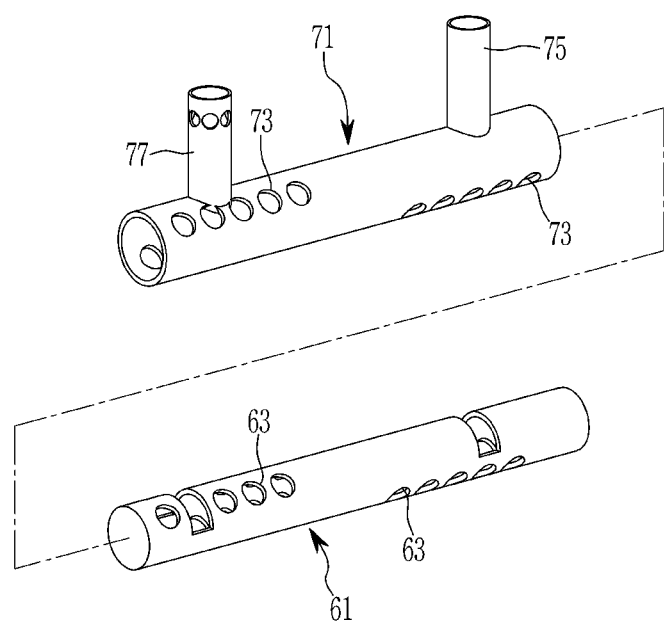

Referring to FIG. 12, as a third exemplary variation, the connecting passages 63 of the valve body 61 and the valve passages 73 of the valve housing 71 may have holes of the same size disposed mutually asymmetrically in a certain section of the valve body 61 and the valve housing 71 at the exhaust air inlet 75 and the exhaust air outlet 77 of the valve housing 71.

In the third exemplary variation, the exhaust air can be discharged through the connecting passages 63 and valve passages 73 only from the exhaust air inlet 75 of the valve housing 71 by the rotation of the valve body 61.

In the third exemplary variation, the exhaust air can be discharged through the connecting passages 63 and valve passages 73 only from the exhaust air outlet 77 side of the valve housing 71 by the rotation of the valve body 61.

Accordingly, in the third exemplary variation, the exhaust air is discharged through the connecting passages 63 and the valve passages 73 only from the exhaust air outlet 77 by the rotation of the valve body 61 in the first condition as mentioned above, so that the humidifying amount of the supply air can be minimized by inducing the same flow direction of the supply air and the exhaust air.

In the third exemplary variation, the exhaust air is discharged through the connecting passages 63 and the valve passages 73 only from the exhaust air inlet 75 side by the rotation of the valve body 61 in the second condition as described above, so that the humidifying amount of supply air can be maximized by the action like the first and second exemplary variations.

Figure 13:
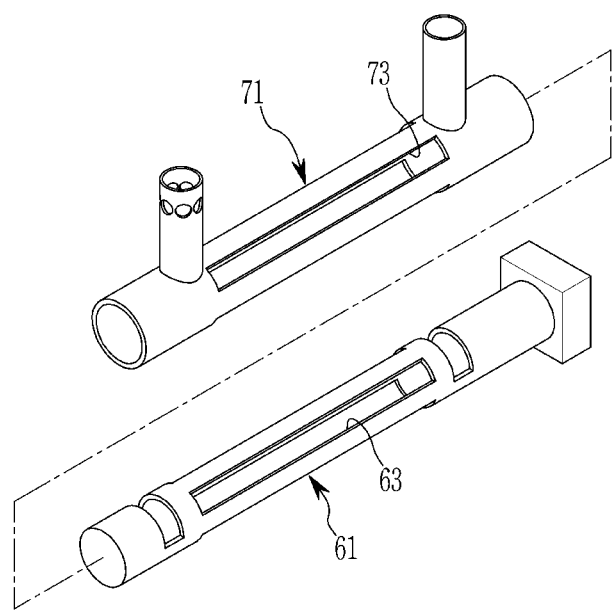

Referring to FIG. 13, as a fourth exemplary variation, the connecting passage 63 of the valve body 61 may be formed as a single hole type and a plurality of rows along the longitudinal direction of the valve body 61.

The valve passage 73 of the valve housing 71 may have a single hole shape corresponding to the connecting passage 63 and may be formed as a plurality of rows along the longitudinal direction of the valve housing 71.

For example, the connecting passage 63 and the valve passage 73 may be formed in the shape of a slit of a rectangle along the longitudinal direction of the valve body 61 and the valve housing 71, as in the drawing.

However, the present disclosure is not limited to this, and the connecting passage 63 and the valve passage 73 may be formed in a slit shape having various shapes besides the rectangle.

Thus, in the fourth exemplary variation, the productivity of the valve body 61 and the valve housing 71 can be improved by forming the connecting passage 63 and the valve passage 73 into a single hole.

As described above, according to the exemplary variations of the valve body 61 and valve housing 71 applied to the humidifying device for the fuel cell according to the exemplary embodiment of the present disclosure, the connecting passage 63 and the valve passage 73 are formed in various hole patterns, so that the humidifying performance of the entire humidifying device can be further improved.

While this disclosure has been described in connection with what is presently considered to be practical exemplary embodiments, it is to be understood that the disclosure is not limited to the disclosed embodiments, but on the contrary, is intended to cover various modifications and equivalent arrangements included within the spirit and scope of the appended claims.

What is claimed is:

1. A humidifying device, which exchanges moisture between air supplied from an air compressor and air exhausted from a fuel cell, the humidifying device comprising:
   a housing main body;
   at least one humidifying membrane module disposed in the housing main body; and
   a valve assembly disposed in the housing main body and adjusting a supply amount of exhaust air flowed into the at least one humidifying membrane module based on a predetermined supply amount of supply air flowed into the at least one humidifying membrane module,
   wherein the valve assembly comprises:
      a valve housing of a cylinder shape having a plurality of valve passages spaced apart from each other along a longitudinal direction of the valve housing; and
      a valve body of a cylinder shape having a connecting passage connected with each of the plurality of valve passages,
   wherein the valve body is rotatably arranged inside the valve housing.

2. The humidifying device of claim 1, wherein the valve assembly adjusts an opening amount of each of the plurality of valve passages and the connecting passage through rotation of the valve body and adjusts the supply amount of the exhaust air.

3. The humidifying device of claim 1, wherein the plurality of valve passages are closed by rotation of the valve body to bypass the exhaust air to outside the housing main body.

4. A humidifying device, which exchanges moisture between air supplied from an air compressor and air exhausted from a fuel cell, the humidifying device comprising:
   a housing main body including:
      a first cap having a supply air inlet;
      a second cap having a humidifying air outlet; and
      a mid-housing between the first and second caps;
   at least one humidifying membrane module disposed in the mid-housing, wherein the at least one humidifying membrane includes:
      a case having a plurality windows spaced apart from each other in a longitudinal direction; and
      a plurality of hollow fiber membranes for connecting the first and second capsinside the case;
   a valve body rotatably arranged inside the mid-housing and having a cylinder shape with a first end closed, wherein the valve body has a plurality of connecting passages on a lateral surface of the valve body respectively corresponding to the plurality of windows; and a valve housing of a cylinder shape having a plurality of valve passages on a lateral surface of the valve housing selectively connected with the plurality of connecting passages of the valve body and spaced apart from each other along the longitudinal direction, wherein the valve housing includes an exhaust air inlet and an exhaust air outlet communicate with an interior of the valve body, is coupled to an external circumference of the valve body in a axial direction, and is fixed at the mid-housing.

5. The humidifying device of claim 4, wherein both ends of the at least one humidifying membrane module is fixed at both sides of the mid-housing through a potting layer.

6. The humidifying device of claim 4, wherein a valve actuator for rotating the valve body is attached to an inner side surface of the second cap, and wherein the valve body has a second end open inside the mid-housing such that an end of the valve actuator is fitted into the second end to be connected to the valve body.

7. The humidifying device of claim 4, wherein the exhaust air outlet has at least one shell out hole communicating with the inside of the mid-housing.

8. The humidifying device of claim 4, wherein the at least one humidifying membrane module has a shell side path as an exhaust air flow passage around the plurality of hollow fiber membranes inside the case.

9. The humidifying device of claim 4, wherein the at least one humidifying membrane module includes a plurality of humidifying membrane modules radially arranged around the valve housing.

10. The humidifying device of claim 4, wherein the at least one humidifying membrane module is sliding-coupled to an inner side surface of the mid-housing through at least one protrusion protruding outwardly on an external circumference of the case and extending in the longitudinal direction.

11. The humidifying device of claim 4, wherein the valve body is disposed to be rotatable at a predetermined rotation angle range by the valve actuator and includes at least two slots communicating with the exhaust air inlet and exhaust air outlet, respectively, in the predetermined rotation angle range.

12. The humidifying device of claim 4, wherein the valve housing is fixed inside the mid-housing through the exhaust air inlet and exhaust air outlet.

13. The humidifying device for the fuel cell of claim 12, wherein the exhaust air inlet is located toward the second cap and fixed at the mid-housing, and wherein the exhaust air outlet is located toward the first cap and fixed at the mid-housing.

14. The humidifying device of claim 4, wherein each of the plurality of connecting passages has a hole shape and spaced apart from each other along the longitudinal direction, and wherein each of plurality of the valve passages has a hole shape corresponding to the connecting passage.

15. The humidifying device of claim 14, wherein each of the plurality of connecting passages and the plurality of valve passages has a diameter gradually decreasing from the exhaust air inlet toward the exhaust air outlet.

16. The humidifying device of claim 14, wherein each of the valve body and the valve housing has two sections when divided by half, and wherein the valve body and the valve housing have the plurality of connecting passages and the plurality of valve passages, respectively, on a section having the exhaust air inlet.

17. The humidifying device of claim 14, wherein each of the valve body and the valve housing has two sections when divided by half, and wherein a first plurality of connecting passages among the plurality of connecting passages in one section having the exhaust air inlet of the valve body are asymmetric to a second plurality of connecting passages among the plurality of connecting passages in the other section having the exhaust air outlet of the valve body, and a first plurality of valve passages among the plurality of valve passages in one section of the valve housing are asymmetric to a second plurality of valve passages among the plurality of valve passages in the other section of the valve housing to correspond to the first plurality of connecting passages and the second plurality of connecting passages, respectively.

18. The humidifying device of claim 4, wherein the plurality of connecting passages are spaced part from each other in a row along the longitudinal direction, and the plurality of valve passages are spaced part from each other in a row along the longitudinal direction.

19. The humidifying device of claim 4, wherein the plurality of hollow fiber membranes are packaged in a bundle by a mesh net and inserted into the case.

\* \* \* \* \*